United States Patent [19]

Boitz et al.

[11] Patent Number: 4,502,233
[45] Date of Patent: Mar. 5, 1985

[54] SHAFT ALIGNMENT APPARATUS AND METHOD

[75] Inventors: Gary L. Boitz, Willow; Thomas C. Tulk, Wasilla, both of Ak.

[73] Assignee: Atlantic Richfield Company, Los Angeles, Calif.

[21] Appl. No.: 511,620

[22] Filed: Jul. 7, 1983

[51] Int. Cl.³ .............................................. G01B 3/30
[52] U.S. Cl. .................. 33/181 AT; 474/148; 33/412; 415/122 R
[58] Field of Search .......... 474/148; 33/412, 180 AT, 33/181 R, 181 AT; 415/122 R

[56] References Cited

U.S. PATENT DOCUMENTS

| | | | |
|---|---|---|---|
| 3,664,029 | 5/1972 | Glucoft et al. | 33/412 X |
| 4,367,594 | 1/1983 | Murray, Jr. | 33/412 X |
| 4,428,126 | 1/1984 | Banks | 33/412 X |
| 4,451,992 | 6/1984 | Malak | 33/412 |

Primary Examiner—James A. Leppink
Assistant Examiner—Frank H. McKenzie, Jr.
Attorney, Agent, or Firm—Robert M. Betz

[57] ABSTRACT

In taking dial indicator readings as a part of the so-called "reverse indicator" shaft alignment procedure for a turbine-to-compressor drive, the high breakaway torque necessary to initiate rotation of the turbine shaft is supplied by connecting such shaft to power drive means through a power chain. In this manner the turbine shaft may be quickly rotated in small, precisely controllable increments without overshoot, thus saving valuable time otherwise wasted in performing this function manually. Tapered, hollow alignment brackets minimize "bracket sag".

5 Claims, 3 Drawing Figures

SHAFT ALIGNMENT APPARATUS AND METHOD

BACKGROUND OF THE INVENTION

This invention relates generally to techniques for alignment of shafts of rotating equipment. More particularly, the invention is concerned with a technique for aligning the shafts of interconnected machines.

The procedures are well known for accomplishing alignment of the mating shafts of two pieces of interconnected machinery such as a turbine which drives a compressor. See for example an article by C. Jackson in *Hydrocarbon Processing* for September, 1971, pages 189 to 194 entitled "How to Align Barrel-Type Centrifugal Compressors". See also an article by Jack N. Essinger also in *Hydrocarbon Processing* for September, 1973, pages 185 to 188 entitled "A Closer Look at Turbo Machinery Alignment".

Misalignment between the coupled-together driving and driven shafts of two or more items of rotating equipment creates many problems such as vibration, failed couplings, reduced thrust and the like. In order to avoid such misalignment, a well-known prior art technique for the alignment of two such interconnected shafts is the so-called "reverse indicator" procedure. In this procedure, an elongated alignment bracket or bar is attached to each shaft extending in the direction of the opposite shaft across the gap constituting the coupling spacer length usually about 60 inches. The free end of each bracket is provided with a dial indicator, the stem of which makes normal contact with the OD of the opposite shaft. In accordance with standard procedure, the two shafts are rotated simultaneously through precise 90° increments. Dial indicator readings are taken at each position on the OD of both shafts. These readings may be recorded on what is known as an alignment map in the cold alignment position and thereafter in a hot equilibrium position at which point the two shafts should be in perfect alignment. If not, some shim corrections may have to be made under one or both pieces of equipment and the readings taken again.

One difficulty in the performance of this procedure is that the shafts must be turned in one direction only. If the precise degree position is overshot, one must continue rotation in the same direction until precisely the proper angular position is again reached. With conventional manual turning devices, it is very difficult to rotate the shaft of a high inertia device. For example, a large turbine may have a breakaway inertia of 2500 foot pounds. The corresponding momentum of such a turbine shaft makes it extremely difficult to avoid overshoot and to stop the shaft at precisely 90° rotational intervals to within plus or minus a quarter of a degree. Not only do these problems make accurate alignment difficult, but the procedure of taking multiple reverse indicator alignment readings for a single pair of shafts can easily take many hours.

A typical manual shaft turning technique is to bolt one end of a straight piece of pipe to the shaft hub and have two men apply torque by means of a long "cheater bar" which is passed through transverse holes at the other end. This is unsatisfactory for several reasons. First, if the pipe is attached to the same bolt circle as the alignment fixture, its removal may disturb the dial indicator readings and force the turning crew to start over. Also, the use of such a cheater bar is dangerous. If the momentum of the shaft, once started, is so great that there is no time to remove the cheater bar, it will be carried around and driven with force against the adjacent floor. The potential hazard to personnel is obvious.

A further problem encountered in the reverse indicator shaft alignment procedure is that of so called "bracket sag". Alignment brackets typically consist of constant diameter pipe which inevitably deflects several mils between its two ends. Careful alignment work requires that this deflection be accurately determined and that appropriate corrections be made in the data.

It is therefore a general object of this invention to provide an improved procedure for the alignment of shafts of interconnected rotating equipment.

It is a more particular object of this invention to provide a procedure for shaft alignment with greater economy of time and safety than heretofore realized together with improved accuracy.

Other and further objects and advantages of this invention will become apparent from a consideration of the detailed description of the drawings to follow, taken in conjunction with the appended claims.

SUMMARY OF THE INVENTION

In accordance with the preferred embodiment of this invention, a reverse indicator method for determining the alignment of the respective shafts of a pair of interconnected pieces of rotating equipment, comprises the steps of affixing drive means to at least one of said shafts for rotation thereof in 90° increments, rotating said one shaft through said drive means from a power source, and controlling the maximum rotational velocity of said one shaft such that upon interruption of said power source, the subsequent free angular rotation of said shaft does not exceed a predetermined maximum. The invention also comprises an apparatus useable in the practice of such method wherein a driven sprocket concentrically affixed to said one shaft is interconnected through a power chain to a driving sprocket which is in turn rotatable from a power source at a velocity such that upon the disabling of said power source the subsequent angular travel of the one shaft does not exceed a predetermined maximum.

A BRIEF DESCRIPTION OF THE DRAWINGS

DETAILED DESCRIPTION OF THE PREFERRED EMBODIMENTS

Figure 1:
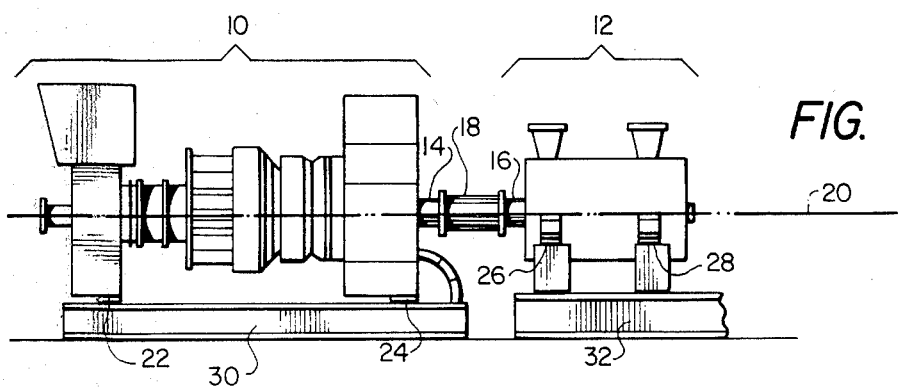
FIG. 1 is an elevational diagrammatic view of a turbine and compressor whose shafts may be aligned in accordance with this invention.

With reference now to FIG. 1, there is illustrated a turbine 10 and a compressor 12 whose respective shafts 14 and 16 are coupled together by means of coupling 18. Ideally the center lines of shafts 14 and 16 coincide exactly in operating condition along line 20. In order for this to occur, shafts 14 and 16, when cold, will in fact be slightly misaligned. With "thermal growth" as the machines reach their operating temperature, shafts 14 and 16 should pull into the correct alignment. If shaft alignment procedures reveal a misalignment between shafts 14 and 16, correction may be accomplished by adding or removing shims such as shims 22, 24, 26 and 28. These shims vary the clearance between the turbine 10, the compressor 12 and their respective supporting skids 30 and 32.

The improvement with which this invention is concerned involves a procedure whereby shafts such as shafts 14 and 16 are brought into precise alignment, preferably by a reverse indicator method. It should be understood, however, that this invention is adaptable to the alignment of any two or more items of rotating equipment, a turbine and a compressor being selected only for illustrative purposes.

Figure 2:
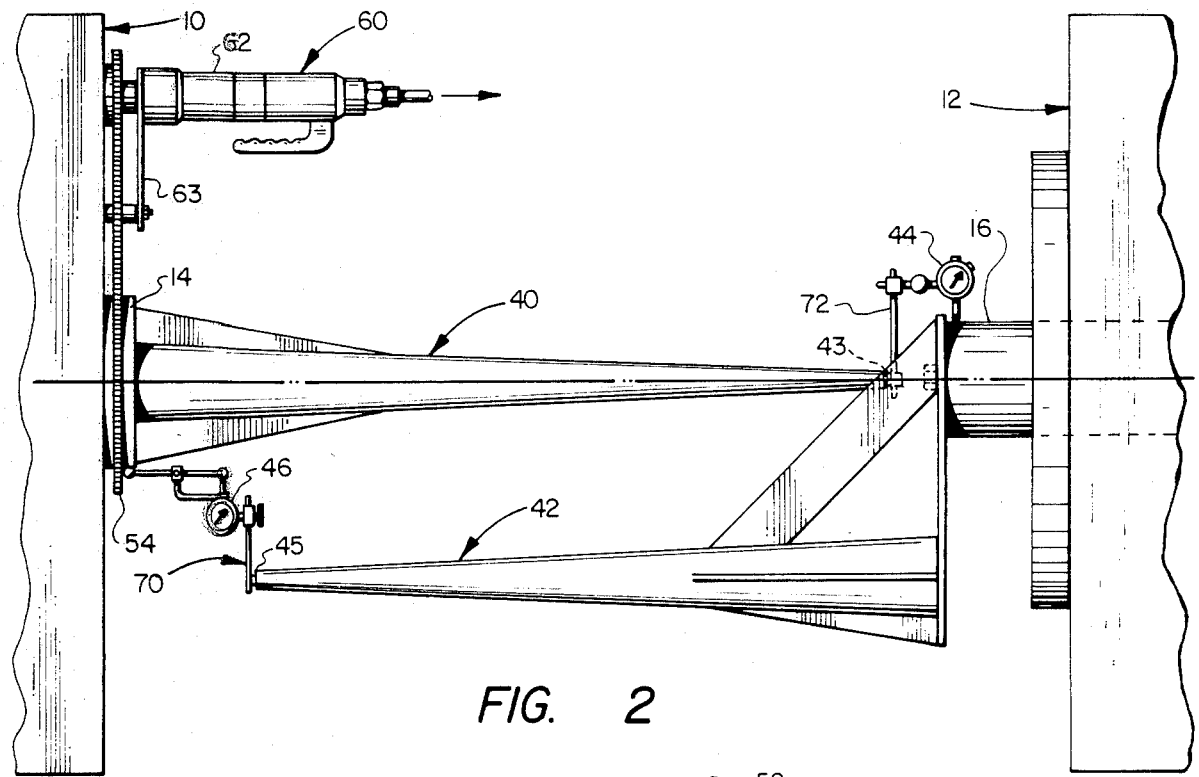
FIG. 2 is a side elevation of an alignment fixture and turning device in accordance with a preferred embodiment of this invention.
Figure 3:
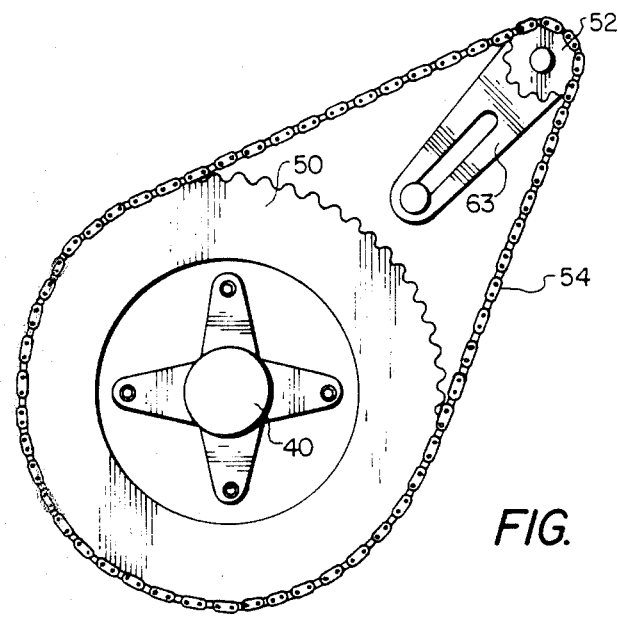
FIG. 3 is a detail of the chain drive by means of which the turbine shaft of FIG. 1 is rotated.

FIGS. 2 and 3 show the general spatial relationship of the features of the alignment brackets and shaft-turning means in accordance with this invention. With turbine 10 and compressor 12 uncoupled, alignment brackets 40 and 42 are positioned for use in a shaft alignment test procedure. One end of bracket 40 is bolted to turbine shaft 14 and the other extends toward the shaft 16 of compressor 12. In like manner, one end of bracket 42 is bolted to the shaft 16 of compressor 12 and the other end extends toward the shaft 14 of turbine 10. As shown, end 43 of bracket 40 carries a dial indicator 44 which reads the OD of shaft 16 while end 45 of bracket 42 carries dial indicator 46 which reads the OD of shaft 14.

In the practice of the method of this invention it is preferable to rotate both shafts 14 and 16 simultaneously through precise 90° increments and take readings at each incremental position by means of indicators 44 and 46. The manner in which these readings are taken and utilized in a reverse indicator shaft alignment procedure are well known and are not necessary to detail here.

To facilitate this operation, power means are provided for rotating the shaft 14 of turbine 10. Affixed concentrically to shaft 14, as best seen in FIG. 3, is a driven sprocket 50 which is linked to a smaller drive sprocket 52 mounted on the face of turbine 10 by means of chain 54. Sprocket 52 is operably connected to a power source such a pneumatic torque wrench 60 (FIG. 2). The housing 62 of torque wrench 60 is detachably fastened to turbine 10 through a bracket 63, whereby wrench 60 is secured in position.

In operation, wrench 60 drives sprocket 52 and through the power chain 54 as described provides the torque necessary to exceed the breakaway torque or turbine 10, typically about 2500 foot-pounds and rotate shaft 14. The particular mechanical advantage of this system depends, of course, upon the relative diameters of sprockets 50 and 52. With the aid of wrench 60, the shaft 14 of turbine 10, can be easily and efficiently rotated through 90° increments. The maximum velocity attained by shaft 14 can be controlled such that upon interruption of power, the free, angular rotation of shaft 14 does not exceed a predetermined maximum, thus eliminating the problem of overshoot.

It will be understood that with far lower breakaway torque, the shaft 16 of compressor 12 may be manually rotated through the same 90° increment simultaneously with rotation or shaft 14 as described. Obviously, power means can be used to drive both shafts if desired. Also within the scope of this invention other pulley-type drive means or gearing arrangements may be substituted.

With particular reference to FIG. 2, a collateral feature of this invention is the particular structure of the alignment brackets 40 and 42, which are constructed preferably as light-weight, hollowed-out aluminum cones. At their respective bases, they are attached to the bolt circles (not shown) of the shafts 14 and 16 and taper sharply toward their respective free ends, 43 and 45. This construction makes it convenient to mount the respective dial indicator assemblies 70 and 72 by insertion of appropriate fittings directly within the open ends 43 and 45 of brackets 40 and 42.

It has been found that the prior art appears to pay insufficient attention to the elimination of bracket sag, a factor which, of course, must be compensated for in any shaft alignment procedure. In a version of this equipment as described wherein brackets 40 and 42 are approximately three feet in length, the end-to-end sag is approximately 0.006 inches, a significant improvement over the comparable figures obtained with more conventional straight-pipe brackets of the prior art.

The time saved by using the power-drive means described in this shaft alignment procedure is impressive. Once the fixture described is installed (a 20 to 30 minute operation) it may be operated with two mechanics, one to operate the power drive, the other to manually turn the compressor shaft 16. As an example, a full set of reverse indicator readings may be recorded in approximately 15 minutes with the aid of this invention. Using prior art manual methods, the same results may take as long as four hours.

Within the scope of this invention, it should be understood that there is no intent to limit the power source to any particular type or to limit the drive mechanism to a chain and sprocket combination. Other variations of the structure and mechanism of the components described will occur to those skilled in the art without departing from the scope of the invention as set forth in the appended method and apparatus claims.

What is claimed is:

1. Apparatus for turning the shaft of an item of rotating equipment in small rotational increments comprising a chain drive consisting of a driving sprocket offset from said shaft, a driven sprocket affixed to said shaft in concentric relation thereto, a power chain linking said driving and driven sprockets; and power means for rotating said driving sprocket at a velocity such that upon the disabling of said power means the subsequent angular travel of said shaft does not exceed a predetermined maximum.

2. In the method of shaft alignment employing a reverse indicator procedure, the improvement comprising the steps of:
    (a) affixing pulley-drive means to at least one of two shafts for rotation thereof in predetermined angular increments;
    (b) rotating said shaft through said pulley-drive means from a power source and;
    (c) controlling the maximum velocity of said shaft such that upon interruption of said power source, a subsequent free angular rotation of said shaft does not exceed a predetermined maximum.

3. The method of claim 2 wherein said pulley-drive means comprises a drive sprocket offset from said shaft, a driven sprocket integral with said shaft, and a power chain linking said drive and driven sprockets.

4. Apparatus for use in the alignment of the respective shafts of two items of rotating equipment adapted to be coupled together comprising:
    (a) a driven sprocket affixed to the shaft of one of said items of equipment in concentric relation thereto;
    (b) a driving sprocket affixed to a housing of said one item of equipment in offset relation to said shaft;
    (c) a chain linking said driving and driven sprocket in power-transmitting relation;
    (d) a power driven torque wrench; and
    (e) means for operatively interconnecting said torque wrench with said driving sprocket.

5. Apparatus as in claim 4 wherein said two items of rotating equipment comprise a turbine and a compressor.

* * * * *